United States Patent Office 3,398,140
Patented Aug. 20, 1968

3,398,140
STEROIDO[17.16-c]PYROZOLES AND
PREPARATION THEREOF
Raymond O. Clinton, East Greenbush, N.Y., assignor to
Sterling Drug Inc., New York, N.Y., a corporation of
Delaware
No Drawing. Filed Aug. 24, 1959, Ser. No. 835,434
38 Claims. (Cl. 260—239.5)

This invention relates to heterocyclic substituted steroids, and in particular it is concerned with steroido [17.16-c]pyrazoles and the preparation thereof, and to certain intermediates in the preparation thereof.

It has been found that new and useful compounds are produced when a pyrazole ring is fused through its 3- and 4-positions to the 17- and 16-positions, respectively, of a steroid nucleus, said steroid having from seventeen to about twenty-three carbon atoms exclusive of ester radicals.

The ring structure of the compounds of the invention is represented by the following structure:

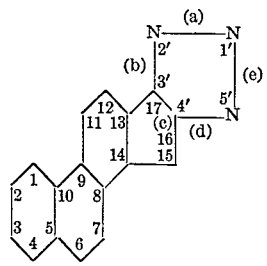

The exact nature of the steroid moiety is not critical. The utility of steroids, including those exhibiting hormonal or other pharmacological or endocrinological properties, is well-known. Such steroid moieties have from seventeen to about twenty-three carbon atoms, not counting carbon content which may be provided by esterified hydroxy groups. Esterified hydroxy-steroids are included within the scope of the invention, but the carbon content contributed by the acid moiety of the ester is not considered part of the essential carbon content of the steroid.

The steroid moiety can be any member of the estrane, androstane or etiocholane series. The foregoing can contain varying degrees of unsaturation and a variety of substituents in the form of hydrocarbon radicals or functional groups conventionally employed in the steroid art. The steroid moiety can have one or more substituents at various positions of the nucleus, for example, hydroxy, mercapto, acyloxy or oxo radicals at positions 1, 2, 3, 4, 5, 6, 7, 11, 12, or 14; halogen atoms, preferably fluorine, chlorine or bromine, for example, at the 2-, 4-, 6-, 7-, 9- or 12-positions; epoxy bridges, for example at the 5, 6-, 9, 11- or 16, 17-positions and lower-alkyl groups, for example, at the 1-, 2-, 3-, 4-, 6- or 11-positions. The steroid moiety can also have one or more double bonds, especially at the 1, 2-, 4, 5-, 5, 6-, 6, 7- or 9, 11-positions, and compounds where ring A or both rings A and B are aromatic are also contemplated. The steroid moiety usually possesses angular methyl groups at $C_{10}$ and $C_{13}$, although 18- and 19-nor-steroids and 18, 19-bisnor-steroids lacking one or both of the angular methyl groups at $C_{13}$ and $C_{10}$, respectively, are also contemplated.

The 18, 19-bisnor-steroid, 18- or 19-nor-steroid, and normal steroid moieties in the compounds of the invention contain respectively, seventeen, eighteen and nineteen carbon atoms plus any carbon content which may be provided by one or more nuclearly substituted hydrocarbon radicals, up to and including a total of about twenty-three carbon atoms.

When acyloxy radicals are present in the steroid moiety, the acyl radicals are preferably derived from carboxylic acids having from one to about ten carbon atoms, conventionally employed in the steroid art, and having a molecular weight less than about 200. Representative of the acyl radicals which can be present are lower-alkanoyl radicals, e.g., formyl, acetyl, propionyl, butyryl, isobutyryl, caproyl, heptanoyl, octanoyl, triymethylacetyl, and the like; carboxy-lower-alkanoyl radicals, e.g., succinyl ($\beta$-carboxypropionyl); cycloalkyl-lower-alkanoyl radicals, e.g., $\beta$-cyclopentylpropionyl, $\beta$-cyclohexylpropionyl, and the like; monocarbocyclic aroyl radicals, e.g., benzoyl, p-toluyl, p-nitrobenzoyl, 3,4,5-trimethoxybenzoyl, and the like; monocarbocyclic aryl-lower-alkanoyl or -alkenoyl radicals, such as phenylacetyl, $\beta$-phenylpropionyl, cinnamoyl, and the like; and monocarbocyclic aryloxy-lower-alkanoyl radicals, such as p-chlorophenoxyacetyl, and the like. Esters of inorganic acids such as phosphoric acid are also contemplated.

The compounds of the invention are prepared by reacting a 16 (1-hydroxyalkylidene)-17-oxo-steroid with a hydrazine, in particular, hydrazine itself or a mono-substituted hydrazine according to the following equation:

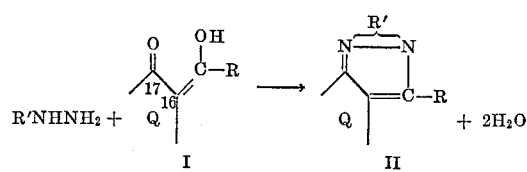

In the above general Formulas I and II, Q represents the remaining portion of the steroid moiety described above.

In the above Formulas I and II, R represents a hydrogen atom or a lower-alkyl radical, the latter having preferably from one to about four carbon atoms, thus including such groups as methyl, ethyl, propyl, isopropyl, butyl, and the like.

In the above Formula II, R' represents a hydrogen atom or a substituent inert under the conditions of the reaction between the hydrazine and 16-(1-hydroxyalkylidene)-steroid. A preferred group of substituents includes lower-alkyl radicals, having from one to about for carbon atoms e.g., methyl, ethyl, propyl, isopropyl, butyl, and the like; monocarbocyclic aryl radicals, e.g., phenyl, p-tolyl, and the like; lower alkanoyl radicals, e.g., acetyl, propionyl, butyryl, and the like; monocarbocyclic aroyl radicals, e.g., benzoyl, p-nitrobenzoyl, p-toluyl, and the like; monocarbocyclic aryl-lower-alkanoyl ralicals, e.g., phenylacetyl, $\beta$-phenylpropionyl, p-chlorophenylacetyl, and the like; monocarbocyclic aryloxy-lower-alkanoyl radicals, e.g., phenoxyacetyl, p-chlorophenoxyacetyl, p-methoxy-phenoxyacetyl, and the like; and the carbamyl and guanyl radicals. When compounds where R' represents acyl, carbmyl or guanyl radicals, the starting mono-substituted hydrazines are mono-acyl hydrazines, semicarbazide or aminoguanidine, respectively. Alternatively, the compounds wherein R' represents hydrogen can be utilized as intermediates for preparing the compounds wherein R' represents an acyl radical or the carbamyl radical by reacting said compounds wherein R' represents hydrogen with the appropriate acid anhydride, or with cyanic acid (an alkali metal cyanate in the presence of mineral acid), respectively.

In the above Formula II, the radical R' is attached to one of the nitrogen atoms of the pyrazole ring, forming one of two possible isomeric structures (IIa and IIb):

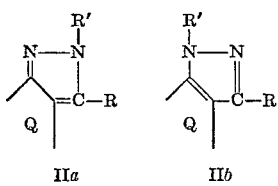

It is not known which of these two forms is produced in a given instance and there is evidence that in some cases both isomers are obtained. This is due to the fact that the 16-hydroxy-alkylidene-17-oxo-steroid (I) in solution exists in tautomeric equilibrium, viz.:

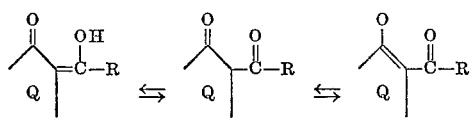

so that the substituted nitrogen portion of the hydrazine (R'NH—) can react with either the substituent in the 16-position or the substituent in the 17-position of the steroid nucleus.

The condensation of the hydrazine or substituted hydrazine with a 16-hydroxyalkylidene-17-oxo-steroid is carried out by heating said steroid with a least one molar equivalent of the hydrazine in an inert solvent at a temperature between about 50° C. and 150° C. The inert solvent is preferably a lower-alkanol, e.g., ethanol.

A particularly preferred group of compounds comprises steroido[17.16-c]pyrazoles of the estrane series, in which the steroid moiety has from seventeen to about nineteen carbon atoms exclusive of ester radicals, including those having the structural formula

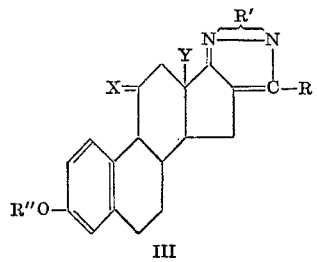

wherein R represents hydrogen or a lower-alkyl radical; R' represents hydrogen or a lower-alkyl, monocarbocyclic aryl, lower-alkanoyl, monocarbocyclic aryloxy-lower-alkanoyl, carbamyl or guanyl radical; R" represents hydrogen or a lower-alkyl radical having from one to about four carbon atoms, or a carboxylic acyl radical; X represents $H_2$, (H)(OH) or O; and Y represents hydrogen or the methyl radical.

Another particularly preferred group of compounds comprises steroido[17.16-c]pyrazoles of the androstane or etiocholane series, in which the steroid moiety has from seventeen to about twenty-three carbon atoms exclusive of ester radicals, including those having the structural formula

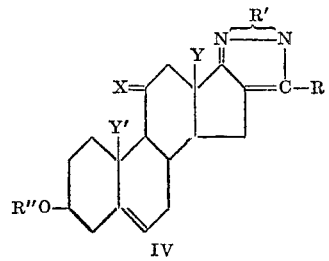

or the corresponding compounds having a double bond in the 5,6-position and having the formula

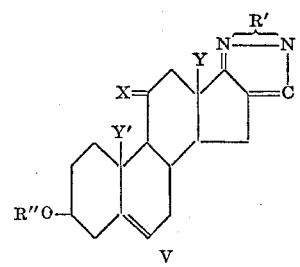

wherein R represents hydrogen or a lower-alkyl radical; R' represents hydrogen or a lower-alkyl, monocarbocyclic aryl, lower-alkanoyl, monocarbocyclic aryloxy-lower-alkanoyl, carbamyl or guanyl radical; R" represents hydrogen or a carboxylic acyl radical; X represents $H_2$, (H)(OH) or O; and Y and Y' represent hydrogen or methyl radicals.

Still another particularly preferred group of compounds comprises steroido[3.2-c][17.16-c]dipyrazoles in which the steroid moiety has from seventeen to about twenty-one carbon atoms exclusive of ester radicals, including those having the structural formula

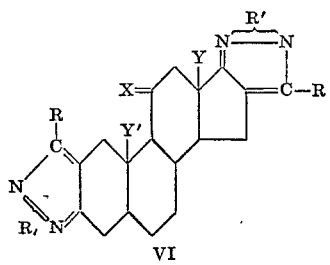

and the corresponding compounds having a double bond in the 4,5-position and having the formula

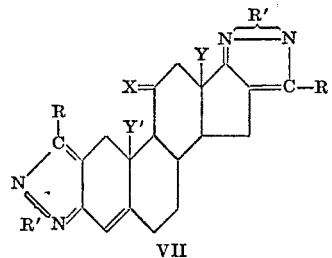

wherein R represents hydrogen or a lower-alkyl radical; R' represents hydrogen or a lower-alkyl, monocarbocyclic aryl, lower-alkanoyl, monocarbocyclic aryloxy-lower-alkanoyl, carbamyl or guanyl radical; X represents $H_2$, (H)(OH) or O; and Y and Y' represent hydrogen or methyl radicals.

The compounds of Formulas IV and VI can belong either to the androstane (rings A/B trans) or the etiocholane (rings A/B cis) series.

The compounds of Formulas III, IV and V are prepared by reacting the appropriate 16-(1-hydroxyalkylidene)-17-oxo-steroid, viz:

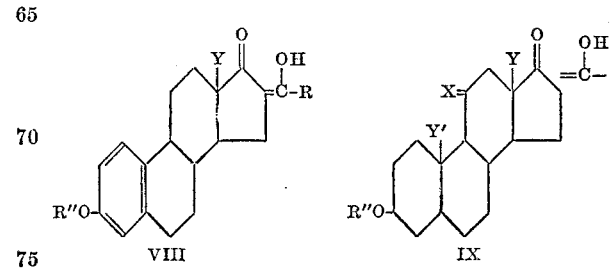

or a Δ⁵-unsaturated analog of IX, with a hydrazine compound R'NHNH₂, R, R', R", X, Y and Y' having the same meanings given above.

The [3.2-c][17.16-c]dipyrazoles exemplified by Formulas VI and VII are prepared by reacting the appropriate 2,16-bis(1-hydroxyalkylidene)-3,17-dioxo-steroid of the androstane or etiocholane series with hydrazine or mono-substituted derivative of hydrazine, at least two molar equivalents of the hydrazine being used relative to the steroid. The intermediates for compounds of Formula VI have the following structure:

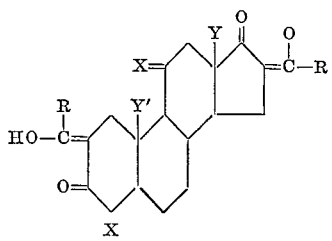

X

R, X, Y and Y' having the same meanings given above. The corresponding Δ⁴-unsaturated compounds lead to compounds of Formula VII.

Although, by analogy with halogenation procedures, it would be expected that ring A saturated compounds of the etiocholane series (ring juncture A/B cis) would form 4-hydroxyalkylidene derivatives rather than 2-hydroxyalkylidene derivatives, it has been found that the latter are produced preponderantly. This was proved by hydrogenating the double bond of a Δ⁴-steroido[3.2-c]pyrazole to produce a mixture of saturated steroido[3.2-c]pyrazoles of the androstane and etiocholane series, and showing that the etiocholane isomer was identical with that produced by direct formation of the pyrazole from the hydroxymethylene derivative of the parent etiocholane compound. If the hydroxymethylene group had entered the 4-position, the resulting pyrazole would have been fused to the 3,4-position of the steroid nucleus and would have been different from the etiocholano pyrazole obtained by hydrogenation of the Δ⁴ compound.

Steroido[17.16-c]pyrazole compounds having a 3-oxo substituent, viz:

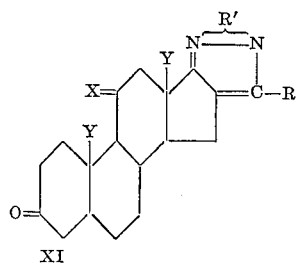

XI and the corresponding Δ⁴-unsaturated compounds, wherein R, R', X, Y and Y' have the same meanings given hereinabove, are also within the scope of the invention but cannot be prepared directly from the parent 3,17-dioxo-steroid because of the reactivity of the 3-oxo substituent. Compounds of Formula XI can, however, be synthesized as follows. A compound of Formula IV or V where R" represents hydrogen, preferably in the form of the N-carbamyl derivative (R'=CONH₂) is oxidized by means of reagents conventionally used to oxidize carbocyclic hydroxy groups to oxo groups, e.g., chromic oxide or the reagents of the Oppenauer procedure (a volatile ketone and the aluminum salt of an organic hydroxy compound).

Alternatively, one can start with a steroid of the type:

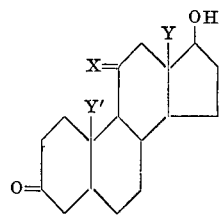

or a ring unsaturated analog thereof. The 3-oxo group is protected as a ketal derivative and the 17-hydroxy group then oxidized under non-acidic conditions as by chromic oxide in pyridine. The resulting 17-oxo-3-ketal, as illustrated by the structure

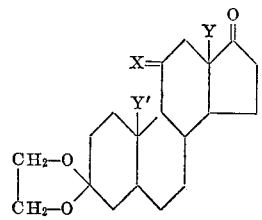

is then subjected to hydroxymethylation in the 16-position and reaction with hydrazine or a derivative thereof, and the ketal is finally cleaved with dilute acid to give a compound of Formula XI. An oxo group at the 11-position (X=O) is relatively unreactive and need not be protected before introduction of the hydroxymethylene group or reaction with hydrazine.

The intermediate 16-hydroxyalkylidene-17-oxo-steroids (I) are prepared by condensing the appropriate 17-oxo-steroid with a lower-alkyl lower-alkanoate, RCOOR''', wherein R represents hydrogen or lower-alkyl and R''' represents lower-alkyl, in the presence of a strong base under anhydrous conditions. The strong base is preferably an alkali metal lower-alkoxide, amide or hydride. An acyl group enters the 16-position with elimination of a molecule of an alcohol as follows:

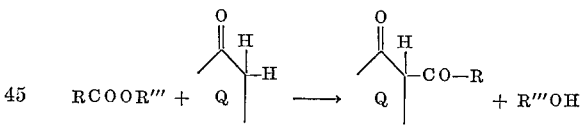

In the case wherein the radical R represents lower-alkyl an alternative and preferred method comprises treating the 17-oxo-steroid with a lower-alkanoic acid anhydride in the presence of boron trifluoride.

In the event that the starting material contains a 3-oxo radical as well as a 17-oxo radical, the hydroxyalkylidene group also enters the 2-position to give a 2,16-bis(1-hydroxyalkylidene)-3,17-dioxo-steroid, exemplified by Formula X above, intermediates for the bis-pyrazoles of Formula VII. In this case at least two molar equivalents of lower-alkyl lower-alkanoate and strong base (or of lower-alkanoic acid anhydride) relative to the amount of 3,17-dioxo-steroid are employed.

Pyrazoles are weakly basic substances and will form acid-addition salts upon addition of strong acids and quaternary ammonium salts upon addition of esters of strong acids.

The quaternary ammonium salts of the compounds of the invention are prepared by causing a steroido[17.16-c]pyrazole to react with an ester of a strong inorganic or organic sulfonic acid, said ester preferably having a molecular weight less than about 200. A particularly preferred class of esters, because of their ready availability, are lower-alkyl, lower-alkenyl and monocarbocyclic aryl-lower-alkyl esters, for example, methyl iodide, ethyl iodide, ethyl bromide, propyl bromide, butyl bromide, allyl bromide, methyl sulfate, methyl benzenesulfonate, methyl p-toluenesulfonate, benzyl chloride, o-chlorobenzyl chloride, and the like. The reaction of the steroido

[17.16-c]pyrazole and the quaternizing agent takes place upon simple admixture of the components, preferably in the presence of an inert organic solvent, although heating may be applied to accelerate the reaction.

The acid-addition and quaternary ammonium salts preferably have anions which are pharmacologically acceptable, that is, the anions do not appreciably increase the toxicity of the compound as a whole toward animal organisms. Such anions include, for example, the chloride, bromide, iodide, sulfate or acid sulfate, methanesulfonate, benzenesulfonate, and the like. Salts having toxic anions are, however, useful in that they serve as characterizing derivatives of the steroido[17.16-c]pyrazoles, and serve as intermediates for non-toxic quaternary salts by conventional ion exchange reactions. All acid-addition salts, regardless of the nature of the anions, are useful as intermediates in the purification of the free bases.

Endocrinological studies of the steroido[17.16-c]pyrazoles of the invention have shown that they possess useful metabolic, hormonal or anti-hormonal properties, for example, anabolic, androgenic, esterogenic, or pituitary inhibiting activity. The compounds of the invention are also useful as intermediates in the preparation of different species within the scope of the invention by introduction of new groups or alteration of groups already present in the steroid nucleus by known methods. For example, the compounds of Formula IV are intermediates for the compounds of Formula XI by oxidation of the 3-hydroxy group, and the 3-oxo compounds of Formula XI in turn can be reacted with methylmagnesium bromide to give the corresponding 3-methyl-3-hydroxy compounds, or with potassium acetylide to give the corresponding 3-ethynyl-3-hydroxy compounds. It is likewise possible to effect alkylation of the 3-oxo compounds in the 2- and/or 4-positions, and halogenation of 3-oxo-$\Delta^4$-unsaturated compounds in the 6-position by allylic halogenation procedures. These are but a few illustrations of the many well-known transformations which can be carried out in the steroid nucleus.

The compounds of the invention can be prepared for use by dispersing them in an aqueous suspension or by dissolving them in a pharmacologically acceptable oil or oil-water emulsion for parenteral administration; by incorporation in tablet form with excipients for oral administration; or by formulation as an ointment or cream for topical application.

The structure of the compounds of the invention was established by the mode of synthesis, their ultraviolet and infrared spectra, and by the fact that the values found upon elementary analysis corresponded with the values calculated for the assigned structures.

The following examples will further illustrate the invention without the latter being limited thereby.

EXAMPLE 1

(a) 3-hydroxy-16-hydroxymethylene - 1,3,5(10)-estratrien-17-one.—Estrone (10.0 g.) was dissolved in 2 liters of hot, dry benzene, and the solution was added to dry, powdered sodium methoxide (prepared from 8.5 g. of sodium in an excess of methanol followed by removal of the excess methanol). The mixture was stirred for fifteen minutes and 20 ml. of redistilled ethyl formate was then added. The reaction mixture was stirred for eighteen hours at room temperature, refluxed for ten minutes and cooled to 45° C. Another 10 ml. of ethyl formate was added and the mixture refluxed for one-half hour longer. After cooling the mixture to 10° C., 1 liter of ice water was added with vigorous stirring followed by 120 ml. of 6 N hydrochloric acid. Ether was added and the mixture was stirred until two clear layers were obtained upon standing. The organic layer was separated, and the aqueous layer was extracted once with 500 ml. of ether. The ether extracts were combined with the organic layer, dried over anhydrous sodium sulfate and concentrated to a small volume in vacuo. The resulting solid product was collected by filtration to give 9.00 g. of 3-hydroxy-16-hydroxymethylene-1,3,5(10)-estratrien-17-one, M.P. 229–232° C. (uncorr.).

(b) 3-hydroxy - 1,3,5(10)-estratrieno[17.16-c]pyrazole [III; R, R' and R'' are H, X is H, Y is $CH_3$].—A solution of 6.4 g. of 3-hydroxy-16-hydroxymethylene-1,3,5(10)-estratrien-17-one, 3.0 g. of hydrazine hydrate and 10 drops of glacial acetic acid in 250 ml. of ethanol was refluxed for twenty-four hours. The reaction mixture was allowed to stand for fifteen hours at room temperature and then concentrated to dryness on a steam bath in vacuo. The residue was dissolved in a minimum amount of hot ethanol, the solution concentrated to one-half its original volume, and hot water was then added until the solution became turbid. The product was allowed to crystallize and collected by filtration. This purification procedure was repeated three times to give 3-hydroxy-1,3,5(10)-estratrieno-[17.16-c]pyrazole in the form of colorless crystals, M.P. above 300° C. (corr.), $$[\alpha]_D^{25} = +109.1° \pm 0.2°$$

(0.4% in methanol); ultraviolet maxima at 223, 280 and 287 m$\mu$ (E=15,000, 2,100 and 1,900, respectively).

*Analysis.*—Calcd. for $C_{19}H_{22}N_2O$: C, 77.51; H, 7.53; N, 9.52. Found: C, 77.70; H, 7.66; N, 9.20.

3 - hydroxy-1,3,5(10)-estratrieno[17.16-c]pyrazole was found to have an estrogenic activity about $\frac{1}{10}$–$\frac{1}{15}$ that of estrone when measured by the means uterine growth response in immature female rats.

A cream for the treatment of acneform dermatitis was prepared as follows: 0.04 g. of 3-hydroxy-1,3,5(10)-estratrieno[17.16-c]pyrazole was mixed with 99.96 g. of a cream base of the following composition:

| Ingredient: | Grams per kilogram |
|---|---|
| Glycerin | 248 |
| Cetyl alcohol | 100 |
| Sesame oil | 150 |
| Polyoxyl 40 stearate | 50 |
| Glyceryl monostearate | 50 |
| Methyl p-hydroxybenzoate | 1 |
| Purified water | 401 |

The resulting formulation showed no evidence of irritation when applied to the body surface of monkeys or humans.

The hydrochloride salt of 3-hydroxy-1,3,5(10)-estratreino [17.16-c]pyrazole can be prepared by treating a methanol solution of the free base with an excess of ethereal hydrogen chloride. The hydrochloride salt is isolated by concentration of the solution.

The methiodide salt of 3-hydroxy-1,3,5(10)estratrieno-[17.16-c]pyrazole can be prepared by heating a methanol solution of the free base with an excess of methyl iodide in a bomb tube at 100° C. for several hours. The product is isolated by concentration of the solution.

By replacement of the hydrazine hydrate in Example 1, part (b) by a molar equivalent amount of phenylhydrazine or aminoguanidine, there can be obtained, respectively, 3-hydroxy-1,3,5(10)-estratrieno[17.16-c]-N-phenylpyrazole [III; R is H, R' is $C_6H_5$, R'' is H, X is $H_2$, Y is $CH_3$] or 3-hydroxy-1,3,5(10)-estratrieno[17.16-c]-N-guanylpyrazole [III; R is H, R' is C(=NH)$NH_2$, R'' is H, X is $H_2$, Y is $CH_3$].

By replacement of the estrone in Example 1 by a molar equivalent amount of 18-norestrone, there can be obtained 3-hydroxy-18-nor-1,3,5(10)-estratrieno[17.16-c]pyrazole [III; R, R', R'' are H, X is $H_2$, Y is H].

EXAMPLE 2

3 - hydroxy - 1 - methyl-1,3,5(10)-estratrieno[17.16-c] pyrazole can be prepared by replacing the estrone in Example 1 by a molar equivalent amount of 1-methylestrone.

EXAMPLE 3

3 - hydroxy - 1,3,5(10),6,8-estrapentaeno[17.16-c]pyrazole can be prepared by replacing the estrone in Example 1 by a molar equivalent amount of equilenin.

EXAMPLE 4

3-hydroxy - 1,3,5(10),7-estratetraeno[17.16-c]pyrazole can be prepared by replacing the estrone in Example 1 by a molar equivalent amount of equilenin.

EXAMPLE 5

3,14 - dihydroxy - 1,3,5(10),6,8-estrapentaeno[17.16-c]pyrazole can be prepared by replacing the estrone in Example 1 by a molar equivalent amount of 14-hydroxyequilenin.

EXAMPLE 6

3 - methoxy - 1,3,5(10) - estratrieno[17.16-c]pyrazole [III; R and R' are H, R'' is $CH_3$, X is $H_2$, Y is $CH_3$] can be prepared by replacing the estrone in Example 1 by a molar equivalent amount of estrone methyl ether.

EXAMPLE 7

3-hydroxy - 11 - oxo-1,3,5-estratrieno[17.16-c]pyrazole [III; R, R' and R'' are H, X is O, Y is $CH_3$] can be prepared by replacing the estrone in Example 1 by a molar equivalent amount of 11-oxoestrone.

EXAMPLE 8

3-hydroxy - 1,3,5(10) - estratrieno[17.16-c]-N-methylpyrazole [III; R is H, R' is $CH_3$, R'' is H, X is $H_2$, Y is $CH_3$] can be prepared by replacing the hydrazine hydrate in Example 1 by a molar equivalent amount of methylhydrazine sulfate, at the same time adding an equivalent amount of aqueous sodium acetate solution.

EXAMPLE 9

3-acetoxy - 1,3,5(10) - estratrieno[17.16-c] - N - acetylpyrazole [III; R is H, R' is $COCH_3$, R'' is $COCH_3$, X is $H_2$, Y is $CH_3$] can be prepared by allowing a solution of 3-hydroxy-1,3,5(10)-estratrieno[17.16-c]pyrazole (Example 1) and an excess of acetic anhydride in pyridine to stand for about two days at room temperature. The product is isolated by adding water and collecting the resulting precipitate of acetylated material.

EXAMPLE 10

3 - hydroxy - 1,3,5(10) - estratrieno[17.16-c]pyrazole-N-carboxamide [III; R is H, R' is $CONH_2$, R'' is H, X is $H_2$, Y is $CH_3$] can be prepared as follows: 5 g. of 3-hydroxy-1,3,5(10)-estratrieno[17.16-c]pyrazole is dissolved in 200 ml. of methanol, and water is added until precipitation begins. Methanol (10 ml.) is added and the solution warmed until the steroid is completely dissolved. The solution is cooled and 15 ml. of ethereal hydrogen chloride containing 0.016 mole of hydrogen chloride is added, followed by 1.3 g. of potassium cyanate in about 3 ml. of water. The desired product precipitates immediately and is collected by filtration.

EXAMPLE 11

(a) 3-acetoxy-16-acetyl-1,3,5(10)-estratriene can be prepared as follows: A mixture of 9.6 g. of glacial acetic acid and 50 ml. of ethylene dichloride is cooled in an ice-bath, and dry boron trifluoride gas is passed into the solution until it is saturated. With continued addition of boron trifluoride, a solution of 11.6 g. of estrone and 12.2 g. of acetic anhydride is 75 ml. of ethylene dichloride is added. The reaction mixture is stirred in the ice-bath for thirty minutes and at room temperature for three hours, and then poured into a solution of 30 g. of sodium acetate trihydrate in 200 ml. of water. The inorganic solvent is distilled off, and the residue refluxed for forty-five minutes and diluted with water. The solid product is collected by filtration.

(b) 3 - acetoxy - 1,3,5(10) - estratrieno[17.16-c] - 5'-methylpyrazole [III; R is $CH_3$, R' is H, R'' is $COCH_3$, X is $H_2$, Y is $CH_3$] can be prepared by reacting 3-acetoxy-16-acetyl-1,3,5(10)-estratriene with hydrazine hydrate according to the manipulative procedure described above in Example 1, part (b).

EXAMPLE 12

(a) 16-hydroxymethyleneandrostan - 3β - ol-17-one.—Androstan-3β-ol-17-one (17.42 g.) was dissolved in 600 ml. of dry benzene, and the solution was added to dry sodium methoxide (prepared from 13.8 g. of sodium in 350 ml. of methanol followed by removal of the excess methanol). Ethyl formate (64.1 ml.) was then added, and the reaction mixture was stirred for four hours under a nitrogen atmosphere and allowed to stand at room temperature for about fifteen hours. The reaction mixture was added to 1.5 liters of water with stirring, and the aqueous layer was separated and acidified with hydrochloric acid. The precipitated product was collected by filtration, washed and dried at 70° C. to give 18.10 g. of 16-hydroxymethyleneandrostan-3β-ol-17-one, M.P. 223–230° C. (uncorr.). When recrystallized from ethanol a sample having the M.P. 233.1–235.2° C. (corr.) was obtained; $[\alpha]_D^{25} = +23.6° \pm 0.3°$ (0.9% in ethanol).

*Analysis.*—Calcd. for $C_{20}H_{30}O_3$: C, 75.43; H, 9.50. Found: C, 75.46; H, 9.62.

(b) 3β-hydroxyandrostano[17.16-c]pyrazole [IV; R, R' and R'' are H, X is $H_2$, Y and Y' are $CH_3$].—A solution of 3.18 g. of 16-hydroxymethyleneandrostan-3β-ol-17-one and 1.00 g. of hydrazine hydrate in 100 ml. of ethanol was refluxed for four and one-half hours. The reaction mixture was cooled, the precipitated product collected, the filtrate concentrated, and the combined product recrystallized from methanol and dried at 100–130° C. in a vacuum oven for sixteen hours to give 3β-hydroxyandrostano[17.16-c]pyrazole in the form of colorless prisms, M.P. 253.4–258.4° C. (corr.);

$$[\alpha]_D^{25} = +20.5° \pm 0.3°$$

(1% in chloroform), ultraviolet maximum at 223 mμ (E=6,365).

*Analysis.*—Calcd. for $C_{20}H_{30}N_2O$: C, 76.38; H, 9.62; N, 8.91. Found: C, 76.46; H, 9.64; N, 9.09.

(c) 3β-acetoxyandrostano[17.16-c] - N-acetylpyrazole [IV; R is H, R' is $COCH_3$, R'' is $COCH_3$, X is $H_2$, Y and Y' are $CH_3$].—A mixture of 3.77 g. of 3β-hydroxyandrostano[17.16-c]-pyrazole, 25 ml. of acetic anhydride and 40 ml. of pyridine was heated on a steam bath for one-half hour. The reaction mixture was quenched in a mixture of ice and dilute sulfuric acid and extracted with chloroform. The chloroform extracts were washed with sodium bicarbonate solution, dried over anhydrous sodium sulfate and concentrated to give 3β-acetoxyandrostano[17.16-c]-N-acetylpyrazole in the form of a yellow resin.

By replacement of the acetic anhydride in the preceding preparation by a molar equivalent amount of succinic anhydride, benzoyl chloride, p-nitrobenzoyl chloride, phenylacetyl chloride or p-chlorophenoxyacetyl chloride, there can be obtained, respectively, 3β-(β-carboxypropionoxy)androstano[17.16-c] - N - (β-carboxypropionyl)pyrazole [IV; R is H, R' and R'' are $COCH_2CH_2COOH$, X is $H_2$, Y and Y' are $CH_3$]; 3β-benzoyloxyandrostano[17.16-c]-N-benzoylpyrazole [IV; R is H, R' and R'' are $COC_6H_5$, X is $H_2$, Y and Y' are $CH_3$]; 3β-(p-nitrobenzoyloxy)androstano[17.16-c] - N - (p-nitrobenzoyl)pyrazole [IV; R is H, R' and R'' are $COC_6H_4NO_2$-p, X is $H_2$, Y and Y' are $CH_3$]; 3β-phenylacetoxyandrostano[17.16-c]-N-phenylacetylpyrazole [IV; R is H, R' and R'' are $COCH_2C_6H_6$, X is $H_2$, Y and Y' are $CH_3$]; or 3β-(p-chlorophenoxyacetoxy)androstano[17.16-c]-N-(p-chlorophenoxyacetyl)pyrazole [IV; R is H, R' and R'' are $COCH_2OC_6H_4Cl$-p, X is $H_2$, Y and Y' are $CH_3$].

EXAMPLE 13

(a) 16 - hydroxymethylene - 5 - androsten - 3β - ol-17-one was prepared from 28.84 g. of 5-androsten-3β-ol-17-one, 13.8 g. of sodium and 50 ml. of ethyl formate in 1000 ml. of anhydrous benzene according to the manipulative procedure described above in Example 12, part (a). There was thus obtained 30.67 g. of 16-hydroxymethylene- 5-androsten-3β-ol-17-one, M.P. 234–239° C. (uncorr.) (dec.).

(b) 3β-hydroxy-5-androsteno[17.16-c]pyrazole [V; R, R' and R'' are H, X is H$_2$, Y and Y' are CH$_3$].—A solution of 3.16 g. of 16-hydroxymethylene-5-androsten-3β-ol-17-one and 1.00 g. of hydrazine hydrate in 100 ml. of ethanol was refluxed for forty-five minutes and allowed to stand at room temperature for about fifteen hours. The reaction mixture was then refluxed for three hours longer and concentrated in vacuo. The residue was extracted with ethyl acetate and the ethyl acetate extracts concentrated in vacuo. The latter residue was recrystallized several times from aqueous methanol and dried for eight hours at 110° C. in vacuo to give 3β-hydroxy-5-androsteno [17.16-c]pyrazole in the form of pale yellow prisms, M.P. 260.7–264.2° C. (corr.) (dec.); [α]$_D^{25}$=−54.2°±0.2° (1% in 95% ethanol).

*Analysis.*—Calcd. for C$_{20}$H$_{28}$N$_2$O: C, 76.88 H, 9.03; N, 8.97. Found: C, 76.60, H, 8.94; N. 9.07.

EXAMPLE 14

(a) 16 - hydroxymethyleneetiocholan-3α-ol-11,17-dione was prepared from 34.65 g. of 3α-acetoxyetiocholane-11, 17-dione, 23.0 g. of sodium, 104 ml. of ethyl formate and 1000 ml. of anhydrous benzene according to the manipulative procedure described above in Example 12, part (a). The product was recrystallized from aqueuos ethanol and dried at 70° C. to give 16-hydroxymethylene-etiochloan-3α-ol-11,17-dione in two crops, 26.15 g., M.P. 240–242° C. (uncorr.) (dec.) and 2.64 g. M.P. 235–238° C. (uncorr.) (dec.)

(b) 3α - hyrdoxy-11-oxoetiocholano[17.16-c]pyrazole [IV; R, R' and R'' are H, X is O, Y and Y' are CH$_3$].— A solution of 3.32 g. of 16-hydroxymethyleneetiocholan-3α-ol-11,17-dione and 1.00 g. of hydrazine hydrate in 100 ml. of absolute ethanol was refluxed for five hours. The reaction mixture was diluted with water and concentrated in vacuo. The residue was recrystallized from acetone and from methanol and dried at 120° C. for twenty hours to give 3α - hydroxy - 11 - oxoetiocholano [17.16-c]pyrazole, M.P. 275.4–279.2°C. (corr.); [α]$_D^{25}$ =+61.1°±0.1° (1% in ethanol), ultraviolet maximum at 223 mμ (E=5,900).

*Analysis.*—Calcd. for C$_{20}$H$_{28}$N$_2$O$_2$: C, 73.13; H, 8.59; N, 8.53. Found: C, 73.10; H, 8.43; N, 8.77.

EXAMPLE 15

3β - hydroxyandrostano[17.16-c]pyrazole - N-carboxamide [IV; R is H, R' is CONH$_2$, R'' is H, X is H$_2$, Y and Y' are CH$_3$] can be prepared from 3β-hydroxyandrostano[17.16-c]pyrazole (Example 12) and cyanic acid according to the manipulative procedure described above in Example 10.

EXAMPLE 16

3 - oxoandrostano[17.16-c]pyrazole - N - carboxamide [XI; R is H, R' is CONH$_2$, X is H$_2$, Y and Y' are CH$_3$] can be prepared by oxidation of 3β-hydroxyandrostano [17.16-c]pyrazole-N-carboxamide (Example 15) with chromic oxide in acetic acid solution. The reaction takes place readily at room temperature or lower over a period of several hours, and the product is isolated by dilution with water and collection of the precipitated product by filtration.

EXAMPLE 17

3-oxoandrostano[17.16-c]pyrazole [XI; R and R' are H, X is H$_2$, Y and Y' are CH$_3$] can be prepared by refluxing for several hours an ethanol solution of 3-oxo-androstano[17.16-c]pyrazole-N - carboxamide (Example 16) containing about 1% by volume of concentrated hydrochloric acid. The product is isolated by neutralizing the acid with ammonium hydroxide, dilution of the solution with water and removal of the ethanol by distillation in vacuo. The product separates as a precipitate which is collected by filtration.

EXAMPLE 18

3β - hydroxy - 5 - androsteno[17.16-c]pyrazole-N-carboxamide [V; R is H, R' is CONH$_2$, R'' is H, X is H$_2$, Y and Y' are CH$_3$] can be prepared by reacting 3β-hydroxy-5-androstano[17.16-c]pyrazole (Example 13) with cyanic acid according to the manipulative procedure described above in Example 10.

EXAMPLE 19

3 - oxo-4-androsteno[17.16-c]pyrazole-N-carboxyamide can be prepared by oxidizing 3β-hydroxy-5-androsteno [17.16-c]pyrazole - N - carboxamide (Example 18) with chromic oxide according to the procedure described above in Example 16.

EXAMPLE 20

3-oxo-4-androsteno[17.16-c]pyrazole can be prepared by decarbamylation of 3-oxo-4-androsteno[17.16-c]pyrazole-N-carboxamide (Example 19) according to the manipulative procedure described above in Example 17.

EXAMPLE 21

(a) 3 - oxo-6-bromo-4-androsteno[17.16-c]pyrazole-N-carboxamide can be prepared by refluxing for about one hour a solution of 3-oxo-4-androsteno[17.16-c]pyrazole-N-carboxamide (Example 19) in dry carbon tetrachloride with a molar equivalent amount or slight excess of N-bromosuccinimide. The brominated product is isolated by filtering the reaction mixture while hot and concentrating the filtrate in vacuo.

(b) 3 - oxo - 4,6 - androstadieno[17.16-c]pyrazole-N-carboxamide can be prepared by refluxing 3-oxo-6-bromo-4-androsten[17.16-c]pyrazole-N-carboxamide with freshly distilled gamma-collidine for about one hour. The reaction mixture is then added to ice water containing sufficient sulfuric acid to neutralize the collidine and the precipitated product collected by filtration.

EXAMPLE 22

3-oxo-4,6-androstadieno[17.16-c]pyrazole can be prepared by decarbamylation of 3 - oxo-4,6-androstadieno [17.16-c]pyrazole-N-carboxamide (Example 21) according to the manipulative procedure described above in Example 17.

EXAMPLE 23

2 - methyl - 3 - oxo-4-androsteno[17.16-c]pyrazole-N-carboxamide can be prepared by reacting 3-oxo-4-androsteno[17.16-c]pyrazole-N-carboxamide (Example 19) first with ethyl oxalate and then with methyl iodide in the presence of potassium tertiary-butoxide, followed by cleavage of the 2-ethoxyallyl radical by heating with potassium tertiary-butoxide in tertiary-butyl alcohol solution. The procedural details for the introduction of a 2-methyl group into a 3-oxo-steroid are given by Ringold et al., J. Org. Chem. 21, 1333 (1956).

EXAMPLE 24

2-methyl-3-oxo-4-androsteno[17.16-c]pyrazole can be prepared by decarbamylation of 2-methyl-3-oxo-4-androsteno[17.16-c]pyrazole-N-carboxamide (Example 23) according to the manipulative procedure described above in Example 17.

EXAMPLE 25

4,4 - dimethyl - 3 - oxo-5-androsteno[17.16-c]pyrazole-N-carboxamide can be prepared by treating 3-oxo-4-androsteno[17.16-c]pyrazole-N-carboxamide (Example 19) with an excess of methyl iodide in the presence of potassium tertiary-amyloxide in tertiary-amyl alcohol. The product is isolated by adding water, concentrating the reaction mixture to a small volume, and collecting the precipitated product.

EXAMPLE 26

4,4 - dimethyl - 3 - oxo-5-androsteno[17.16-c]pyrazole can be prepared by decarbamylation of 4,4-dimethyl-3- oxo-5-androsteno[17.16-c]pyrazole-N-carboxamide (Example 25) according to the manipulative procedure described above in Example 17.

EXAMPLE 27

5α,6α - epoxy - 3β - hydroxyandrostano[17.16-c]pyrazole can be prepared by reacting 3β-hydroxy-5-androsteno[17.16-c]pyrazole (Example 13, part (b)) with at least one molar equivalent of peracetic acid in chloroform solution in the presence of sodium acetate. The reaction takes place at room temperature, and the product separates as a precipitate which can be collected by filtration.

EXAMPLE 28

3β,5α - dihydroxy - 6β - methylandrostano[17.16]pyrazole can be prepared by reacting 5α,6α-epoxy-3β-hydroxy-androstano[17.16-c]pyrazole (Example 27) with methylmagnesium iodide in benzene solution. The reaction takes place upon refluxing the solution for a few hours, and the product is isolated by hydrolysis and extraction of the product with an organic solvent.

EXAMPLE 29

6α - methyl - 3 - oxo - 4 - androsteno[17.16-c]pyrazole can be prepared by treating 3β,5α-dihydroxy-6β-methyl-androstano[17.16-c]pyrazole (Example 28) with cyclohexanone and aluminum isopropoxide in toluene solution under conventional Oppenauer conditions.

EXAMPLE 30

3 - hydroxyandrostano[17.16-c]pyrazole - N - carboxamide can be caused to react with butyric anhydride, caproyl chloride, succinic anhydride, β-cyclopentylpropionyl chloride, benzoyl chloride, p-nitrobenzoyl chloride, 3,4,5-trimethoxybenzoyl chloride, phenylacetyl chloride, or cinnamoyl chloride, to produce, respectively, 3β-butyroxyandrostano[17.16-c]pyrazole - N - carboxamide, 3β-caproyloxyandrostano[17.16-c]pyrazole - N - carboxamide, 3β - (β-carboxypropionoxy)androstano[17.16-c]pyrarole - N - carboxamide, 3β-(β-cyclopentylpropionoxy)androstano[17.16-c]pyrazole - N - carboxamide, 3β - benzoyloxyandrostano[17.16-c]pyrazole - N - carboxamide, 3β-(p-nitrobenzoyloxy)androstano[17.16-c]pyrazole - N-carboxamide, 3β - (3,5-trimethoxybenzoyloxy)androstano[17.16-c]pyrazole - N - carboxamide, 3β - phenylacetoxy-androstano[17.16-c]pyrazole - N - carboxamide, or 3β-cinnamoyloxyandrostano[17.16-c]pyrazole - N - carboxamide.

EXAMPLE 31

4,5 - dichloro - 3 - oxoandrostano[17.16-c]pyrazole-N-carboxamide can be prepared by reacting 3-oxo-4-androstano[17.16-c]pyrazole-N-carboxamide (Example 19) in ether solution with a solution of chlorine in propionic acid at a temperature of −30° C. The product is isolated by washing with water and dilute sodium bicarbonate solution, and drying and concentrating the ether solution.

EXAMPLE 32

4 - chloro - 3 - oxo - 4 - androstano[17.16-c]pyrazole-N-carboxamide can be prepared by warming a solution of 4,5-dichloro-3-oxoandrostano[17.16-c]pyrazole-N-carboxamide (Example 31) in pyridine for thirty minutes on a steam bath. The product is isolated by adding water and extracting with ether.

EXAMPLE 33

4 - chloro - 3 -oxo - 4 - androstano[17.16-c]pyrazole can be prepared by decarbamylation of 4-chloro-3-oxo-4-androstano[17.16-c]pyrazole - N - carboxamide (Example 32) according to the manipulative procedure described above in Example 17.

EXAMPLE 34

3 - hydroxy - 3 - methylandrostano[17.16-c]pyrazole can be prepared by reacting 3-oxoandrostano[17.16-c]-pyrazole (Example 17) with methylmagnesium iodide in anhydrous ether medium. The product is isolated by hydrolyzing the reaction mixture, and washing and concentrating the ether solution.

EXAMPLE 35

4,4 - dimethyl - 3 - ethynyl - 3 - hydroxy - 5 - androsteno[17.16-c]pyrazole can be prepared by reacting 4,4-dimethyl-3-oxo-5-androsteno[17.16-c]pyrazole (Example 25) with potassium acetylide (prepared from potassium tertiary-butoxide and acetylene in tertiary-butyl alcohol solution). The product is isolated by hydrolyzing the reaction mixture and collecting the water-insoluble product.

EXAMPLE 36

3 - ethynyl - 3 - hydroxyandrostano[17.16-c]pyrazole-N-carboxamide can be prepared by reacting 3-oxoandrostano[17.16-c]pyrazole - N - carboxamide (Example 16) with potassium acetylide (prepared from potassium tertiary-butoxide and acetylene in tertiary-butyl alcohol solution). The product is isolated by hydrolyzing the reaction mixture and collecting the water-insoluble product.

EXAMPLE 37

3 - ethynyl - 3 - hydroxyandrostano[17.16-c]pyrazole can be prepared by decarbamylation of 3 - ethynyl - 3-hydroxyandrostano[17.16-c]pyrazole - N - carboxamide (Example 36) according to the manipulative procedure described above in Example 17.

EXAMPLE 38

1α,3β - dihydroxy - 5 - androsteno[17.16-c]pyrazole can be prepared by introduction of a hydroxymethylene group into the 16-position of 3β-acetoxy-1α-hydroxy-5-androsten-17-one according to the manipulative procedure described above in Example 12, part (a), followed by reacting the resulting product with hydrazine according to the manipulative procedure described above in Example 12, part (b). The 3β-acetoxy group is hydrolyzed during the formylation procedure.

EXAMPLE 39

3β,19-dihydroxy-4-androsteno[17.16-c]pyrazole can be prepared by introduction of a hydroxymethylene group into the 16-position of 3β,19-dihydroxy-4-androsten-17-one according to the manipulative procedure described above in Example 12, part (a), followed by reacting the resulting product with hydrazine according to the manipulative procedure described above in Example 12, part (b).

EXAMPLE 40

3 - ethoxy-3,5-androstadieno[17.16-c]pyrazole can be prepared by introduction of a hydroxymethylene group into the 16-position of 3-ethoxy-3,5-androstadien-17-one according to the manipulative procedure described above in Example 12, part (a), followed by reacting the resulting product with hydrazine according to the manipulative procedure described above in Example 12, part (b).

EXAMPLE 41

3 - ethoxy - 19-nor-3,5-androstadieno[17.16-c]pyrazole can be prepared by introduction of a hydroxymethylene group into the 16 - position of 3-ethoxy-19-nor-3,5-androstadien-17-one according to the manipulative procedure described above in Example 12, part (a), followed by reacting the resulting product with hydrazine according to the manipulative procedure described above in Example 12, part (b).

EXAMPLE 42

3 - ethoxy - 11β - hydroxy-3,5-androstadieno[17.16-c]-pyrazole can be prepared by introduction of a hydroxymethylene group into the 16-position of 3-ethoxy-3,5-androstadien-11β-ol-17-one according to the manipulative procedure described above in Example 12, part (a), followed by reacting the resulting product with hydrazine

EXAMPLE 43

11β - hydroxy - 3 - oxo-4-androsteno[17.16-c]pyrazole can be prepared by heating 3-ethoxy-11β-hydroxy-3,5-androstadieno[17.16-c]pyrazole with dilute ethanolic hydrogen chloride.

EXAMPLE 44

3β - hydroxy - 3α - methylandrostano[17.16-c]pyrazole can be prepared by introduction of a hydroxymethylene group into the 16-position of 3α-methylandrostan-3β-ol-17-one according to the manipulative procedure described above in Example 12, part (a), followed by reacting the resulting product with hydrazine according to the manipulative procedure described above in Example 12, part (b).

EXAMPLE 45

3α,12α-dihydroxyetiocholano[17.16-c]pyrazole can be prepared by introduction of a hydroxymethylene group into the 16-position of 3α,12α-diacetoxyetiocholan-17-one according to the manipulative procedure described above in Example 12, part (a), followed by reacting the resulting product with hydrazine according to the manipulative procedure described in Example 12, part (b). The 3α-and 12α-acetoxy groups are hydrolyzed during the formylation procedure.

EXAMPLE 46

3 - mercapto - 5 - androsteno[17.16-]pyrazole can be prepared by introduction of a hydroxymethylene group into the 16-position of 3-mercapto-5-androsten-17-one according to the manipulative procedure described above in Example 12, part (a), followed by reacting the resulting product with hydrazine according to the manipulative procedure described above in Example 12, part (b).

EXAMPLE 47

3 - hydroxy - 5,7 - androstadieno[17.16-c]pyrazole can be prepared by introduction of a hydroxymethylene group into the 16-position of 3-benzoyloxy-5,7-androstadien-17-one according to the manipulative procedure described above in Example 12, part (a), followed by reacting the resulting product with hydrazine according to the manipulative procedure described above in Example 12, part (b). The 3-benzoyloxy group is hydrolyzed during the formylation procedure.

EXAMPLE 48

3α - hydroxy - 9(11)-etiocholeno[17.16-c]pyrazole can be prepared by introduction of a hydroxymethylene group into the 16-position of 3α-hydroxy-9(11)-etiocholen-17-one according to the manipulative procedure described above in Example 12, part (a), followed by reacting the resulting product with hydrazine according to the manipulative procedure described above in Example 12, part (b).

EXAMPLE 49

9α - bromo - 3α,11β-dihydroxyetiocholano[17.16-c]pyrazole can be prepared by reacting 3α - hydroxy-9(11)-etiocholeno[17.16 - c]pyraxole-N-carboxamide (from 3α-hydroxy-9(11)-etiocholeno-[17.16-c]pyrazole and cyanic acid) with N-bromoacetamide in the presence of perchloric acid in dioxane solution, followed by cleavage of the N-carboxamide group by warming with hydrogen bromide in ethanol solution.

9α - bromo - 3α,11β-dihydroxyetiocholano[17.16-c]pyrazole can be caused to react upon heating with anhydrous potassium acetate in dioxane-alcohol solution to give 9β,11β - epoxy - 3α-hydroxyetiocholano[17.16-c]pyrazole, and the latter in turn can be caused to react with anhydrous hydrogen fluoride in chloroform solution to give 9α - fluoro - 3α,11β - dihydroxyetiocholano[17.16 - c]pyrazole.

EXAMPLE 50

4 - androsteno[17.16-c]pyrazole can be prepared by introduction of a hydroxymethylene group into the 16-position of 4-androsten-17-one according to the manipulative procedure described above in Example 12, part (a), followed by reacting the resulting product with hydrazine according to the manipulative procedure described above in Example 12, part (b).

EXAMPLE 51

5-hydroxyandrostano[17.16-c]pyrazole can be prepared by introduction of a hydroxymethylene group into the 16-position of androstan-5-ol-17-one according to the manipulative procedure described above in Example 12, part (a), followed by reacting the resulting product with hydrazine according to the manipulative procedure described above in Example 12, part (b).

EXAMPLE 52

3β-propionoxyandrostano[17.16-c] - N-propionylpyrazole [IV; R is H, R' and R" are $COC_2H_5$, X is $H_2$, Y and Y' are $CH_3$] can be prepared by allowing a solution of 3β-hydroxyandrostano[17.16-c]pyrazole (Example 12, part (b)) and an excess of propionic anhydride in pyridine to stand for about two days at room temperature. The product is isolated by adding water and collecting the resulting precipitate of acylated material.

EXAMPLE 53

3β-hydroxyandrostano[17.16-c]-N-methylpyrazole [IV; R is H, R' is $CH_3$, R" is H, X is $H_2$, Y and Y" are $CH_3$] can be prepared by reacting 16-hydroxymethyleneandrostan-3β-ol-17-one with methylhydrazine sulfate in ethanol solution in the presence of an equivalent amount of aqueous sodium acetate solution according to the manipulative procedure described below in Example 58, part (b).

EXAMPLE 54

(a) 16-butyrylandrostan-3β-ol-17-one can be prepared by reacting androstan-3βIOA-ol-17-one with butyric anhydride in the presence of boron trifluoride according to the manipulative procedure described above in Example 11, part (a).

(b) 3β-hydroxyandrostano[17.16 - c]-5' - propylpyrazole [IV; R is $CH_2CH_2CH_3$, R' and R" are H, X is $H_2$, Y and Y' are $CH_3$] can be prepared by reacting 16-butyrylandrostan-3β-ol-17-one with hydrazine hydrate according to the manipulative procedure described above in Example 12, part (b).

EXAMPLE 55

3-oxo-4,4-dimethyl-5-androsteno[17.16-c]pyrazole can be prepared by oxidizing 4,4-dimethyl-5-androsten-17β-ol-3-one ethylene glycol ketal (prepared from the free 3-oxo compound and ethylene glycol in benzene solution in the presence of p-toluenesulfonic acid) with chromic oxide in pyridine solution, introducing a hydroxymethylene group into the 16-position of the resulting 4,4-dimethyl-5-androstene-3,17-dione 3-mono-ethylene glycol ketal, according to the manipulative procedure described above in Example 12, part (a), followed by reacting the resulting product with hydrazine hydrate according to the manipulative procedure described above in Example 12, part (b), and finally cleaving the ketal grouping by treating it with ethanolic hydrogen chloride.

EXAMPLE 56

3-oxo-4-methyl-4-androsteno[17.16-c]pyrazole can be prepared by oxidizing 4-methyl-5-androsten-17β-ol-3-one ethylene glycol ketal (prepared from the 4-methyl-4-androsten-17β-ol-3-one and ethylene glycol in benzene solution in the presence of p-toluenesulfonic acid) with chromic oxide in pyridine solution, introducing a hydroxymethylene group into the 16-position of the resulting 4-methyl - 5 - androstene-3,17-dione 3-mono-ethylene glycol ketal, according to the manipulative procedure described above in Example 12, part (a), followed by reacting the resulting product with hydrazine hydrate according to the manipulative procedure described above in Example 12, part (b), and finally cleaving the ketal grouping by treating it with ethanolic hydrogen chloride.

EXAMPLE 57

3-oxo-19-norandrostano[17.16-c]pyrazole [XI; R and R' are H, X is $H_2$, Y is $CH_3$, Y' is H] can be prepared by oxidizing 19-norandrostan-17β-ol-3-one ethylene glycol ketal (prepared from the free 3-oxo compound and ethylene glycol in benzene solution in the presence of p-toluenesulfonic acid) with chromic oxide in pyridine solution, introducing a hydroxymethylene group into the 16-position of the resulting 19-norandrostane-3,17-dione 3-mono-ethylene glycol ketal, according to the manipulative procedure described above in Example 12, part (a), followed by reacting the resulting product with hydrazine hydrate according to the manipulative procedure described above in Example 12, part (b), and finally cleaving the ketal grouping by treating it with ethanolic hydrogen chloride.

EXAMPLE 58

(a) 2,16-bis(hydroxymethylene) - 4 - androstene-3,17-dione was prepared from 26.9 g. of 4-androstene-3,17-dione, 21.6 g. of sodium and 109 ml. of ethyl formate in 900 ml. of dry benzene according to the manipulative procedure described above in Example 12, part (a). The crude crystalline product was recrystallized once from methanol and three times from ethyl acetate, and dried for six hours at 110° C. in vacuo to give 2,16-bis(hydroxymethylene) - 4-androstene-3,17-dione, M.P. 197.6–205.2° C. (corr.)(dec.); $[\alpha]_D^{25} = +35.1° \pm 0.2°$ (1% in chloroform).

Analysis.—Calcd. for $C_{21}H_{26}O_4$: C, 73.66; H, 7.66; O, 18.68. Found: C, 73.47; H, 7.48; O, 19.10.

(b) 4 - androsteno[3.2-c][17.16-c]bis(N - methylpyrazole) [VII; R is H, R' is $CH_3$, X is $H_2$, Y and Y' are $CH_3$].—To a solution of 3.42 g. of 2,16-bis(hydroxymethylene)-4-androstene-3,17-dione in 400 ml. of hot ethanol was added 3.8 g. of sodium acetate in 20 ml. of water followed by 3.0 g. of methylhydrazine sulfate dissolved in a minimum amount of water. The mixture was heated to reflux on a steam bath, 300 ml. of water was added and refluxing was continued for one hour. The reaction mixture was concentrated until nearly all of the ethanol was removed. The residue was extracted with benzene, and the benzene extracts were washed with saturated sodium chloride solution, dried over anhydrous sodium sulfate and concentrated in vacuo. The residue was triturated with ether and the crystalline product recrystallized first from ethyl acetate and then from an ethyl acetate-methanol mixture to give 4-androsteno [3.2-c][17.16-c] - bis(N - methylpyrazole), M.P. 287.4–296.0° C. (corr.); $[\alpha]_D^{25} = +135.6° \pm 0.2°$ (1% in chloroform).

Analysis.—Calcd. for $C_{23}H_{30}N_4$: C, 76.20; H, 8.34; N, 15.46. Found: C, 76.30; H, 8.40; N, 15.39.

EXAMPLE 59

4-androsteno[3.2-c][17.16-c]dipyrazole [VII; R and R' are H, X is $H_2$, Y and Y' are $CH_3$].—A solution of 2.6 g. of 2,16-bis(hydroxymethylene)-4-androstene-3,17-dione, 2.6 g. of hydrazine hydrate and 14 drops of acetic acid in 125 ml. of ethanol was refluxed for twenty-four hours. The reaction mixture was allowed to stand at room temperature for about forty hours, then concentrated to a volume of 75 ml., and about 170 ml. of hot water was added. The mixture was cooled and the precipitated product collected by filtration and recrystallized three times from aqueous ethanol to give 4-androsteno[3.2-c] [17.16-c]dipyrazole, melting point indefinite with softening beginning at 192° C.

EXAMPLE 60

4 - androsteno[4.2-c][17.16-c]bis(pyrazole - N - carboxamide) [VII; R is H, R' is $CONH_2$, X is $H_2$, Y and Y' are $CH_3$].—A mixture of 2 g. of 4-androsteno-[3.2-c][17.16-c]dipyrazole, 0.97 g. of potassium cyanate, 12 ml. of ethereal hydrogen chloride (containing 12 millimoles of hydrogen chloride), 50 ml. of water and 220 ml. of ethanol was allowed to stand at room temperature for one hour. The product which had precipitated was collected by filtration to give 4-androsteno[3.2-c][17.16-c]bis(pyrazole-N-carboxamide), M.P. 229–232° C. (uncorr.).

EXAMPLE 61

(a) 2,16-diacetyl-4-androstene-3,17-dione can be prepared by reacting 4-androstene-3,17-dione with acetic anhydride in the presence of boron trifluoride according to the manipulative procedure described above in Example 11, part (a).

(b) 4 - androsteno[3.2 - c][17.16 - c]bis(5' - methylpyrazole) [VI; R is $CH_3$, R' is H, X is $H_2$, Y and Y' are $CH_3$] can be prepared by reacting 2,16-diacetyl-4-androstene-3,17-dione with hydrazine hydrate according to the manipulative procedure described above in Example 12, part (b).

EXAMPLE 62

11β-hydroxy-6α-methyl - 4 - androsteno[3.2-c][17.16-c]dipyrazole can be prepared by introduction of hydroxymethylene groups into the 2- and 16-positions of 6α-methyl-4-androsten-11β-ol-3,17-dione according to the manipulative procedure described above in Example 12, part (a), followed by reacting the resulting product with hydrazine according to the manipulative procedure described above in Example 12, part (b).

EXAMPLE 63

11-oxo-4-androsteno[3.2-c][17.16-c]dipyrazole [VII; R and R' are H, X is O, Y and Y' are $CH_3$] can be prepared by introduction of hydroxymethylene groups into the 2- and 16-positions of 4-androstene-3,11,17-trione according to the manipulative procedure described above in Example 12, part (a), followed by reacting the resulting product with hydrazine according to the manipulative procedure described above in Example 12, part (b).

EXAMPLE 64

6 - fluoro - 11 - oxo-4-androsteno[3.2-c][17.16-c]dipyrazole can be prepared by introduction of hydroxymethylene groups into the 2- and 16-positions of 6-fluoro-4-androstene-3,11,17-trione according to the manipulative procedure described above in Example 12, part (a), followed by reacting the resulting product with hydrazine according to the manipulative procedure described above in Example 12, part (b).

EXAMPLE 65

7β - 14α - dihydroxyethiocholano[3.2-c][17.16-c]dipyrazole can be prepared by introduction of hydroxymethylene groups into the 2- and 16-positions of etiocholane-7β,14α-diol-3,17-dione according to the manipulative procedure described above in Example 12, part (a), followed by reacting the resulting product with hydrazine according to the manipulative procedure described above in Example 12, part (b).

EXAMPLE 66

18,19-bisnor - 4 - androsteno[3.2-c][17.16-c]dipyrazole [VII; R and R' are H, X is $H_2$, Y and Y' are H] can be prepared by introduction of hydroxymethylene groups into the 2- and 16-positions of 18,19-bisnor-4-androstene-3,17-dione according to the manipulative procedure described above in Example 12, part (a), followed by reacting the resulting product with hydrazine according to the manipulative procedure described above in Example 12, part (b).

EXAMPLE 67

6-hydroxy-3,5-cycloandrostano[17.16-c]pyrazole can be prepared by introduction of a hydroxymethylene group into the 16-position of 6-hydroxy-3,5-cycloandrostan-17-one according to the manipulative procedure described above in Example 12, part (a), followed by reacting the resulting product with hydrazine according to the manipulative procedure described above in Example 12, part (b).

EXAMPLE 68

$\Delta^6$-3,5-cycloandrosteno[17.16-c]pyrazole can be prepared by introduction of a hydroxymethylene group into the 16-position of $\Delta^6$-3,5-cycloandrosten-17-one according to the manipulative procedure described above in Example 12, part (a), followed by reacting the resulting product with hydrazine according to the manipulative procedure described above in Example 12, part (b).

I claim:

1. A steroido[17.16-c]pyrazole in which the steroid moiety has from seventeen to about twenty-three carbon atoms exclusive of ester radicals, and is selected from the group consisting of the estrane, androstane and etiocholane series.

2. A compound having the formula

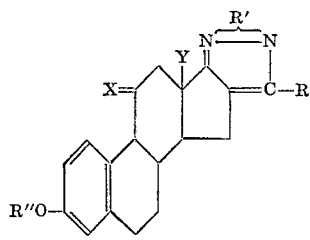

wherein R represents a member of the group consisting of hydrogen and lower-alkyl; R' represents a member of the group consisting of hydrogen, lower-alkyl, monocarbocyclic aryl, lower-alkanoyl, monocarbocyclic aryloxy-lower-alkanoyl, carbamyl and guanyl; R" represents a member of the group consisting of hydrogen, lower-alkyl and carboxylic acyl derived from carboxylic acids having from one to about ten carbon atoms and having a molecular weight less than about 200; X represents a member of the group consisting of $H_2$, (H)(OH) and O; and Y represents a member of the group consisting of hydrogen and methyl.

3. 3-hydroxy-1,3,5(10)-estratrieno [17.16-c]pyrazole.

4. A compound having the formula

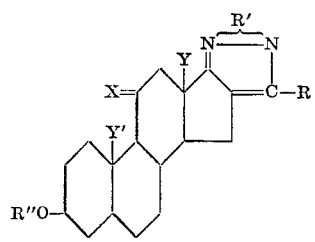

wherein R represents a member of the group consisting of hydrogen and lower-alkyl; R' represents a member of the group consisting of hydrogen, lower-alkyl, monocarbocyclic aryl, lower-alkanoyl, monocarbocyclic aryloxy-lower-alkanoyl, carbamyl and guanyl; R" represents a member of the group consisting of hydrogen and carboxylic acyl derived from carboxylic acids having from one to about ten carbon atoms and having a molecular weight less than about 200; X represents a member of the group consisting of $H_2$, (H)(OH) and O; and Y and Y' represent members of the group consisting of hydrogen and methyl.

5. A compound according to claim 4 in which a double bond is present in the 5,6-position of the steroid nucleus.

6. 3β-hydroxyandrostano[17.16-c]pyrazole.

7. 3β-acetoxyandrostano[17.16-c]-N-acetylpyrazole.

8. 3β-hydroxy-5-androsteno[17.16-c]pyrazole.

9. 3α-hydroxy-11-oxoetiocholano[17.16-c]pyrazole.

10. A compound having the formula

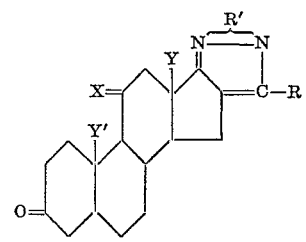

wherein R represents a member of the group consisting of hydrogen and lower-alkyl; R' represents a member of the group consisting of hydrogen, lower-alkyl, monocarbocyclic aryl, lower-alkanoyl, monocarbocyclic aryloxy-lower-alkanoyl, carbamyl and guanyl; X represents a member of the group consisting of $H_2$, (H)(OH) and O; and Y and Y' represent members of the group consisting of hydrogen and methyl.

11. A compound according to claim 10 in which a double bond is present in the 4,5-position of the steroid nucleus.

12. A steroido[3.2c][17.16-c]dipyrazole in which the steroid moiety has from seventeen to about twenty-one carbon atoms exclusive of ester radicals, and is selected from the group consisting of the androstane and etiocholane series.

13. A compound having the formula

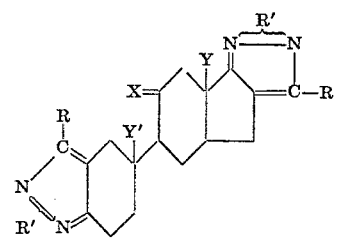

wherein R represents a member of the group consisting of hydrogen and lower-alkyl; R' represents a member of the group consisting of hydrogen, lower-alkyl, monocarbocyclic aryl, lower-alkanoyl, monocarboxyclic aryloxy-lower-alkanoyl, carbamyl and guanyl; X represents a member of the group consisting of $H_2$, (H)(OH) and O; and Y and Y' represent members of the group consisting of hydrogen and methyl.

14. A compound according to claim 13 in which a double bond is present in the 4,5-position of the steroid nucleus.

15. 4 - androsteno[3.2 - c][17.16 - c]bis(N - methylpyrazole).

16. 4-androsteno[3.2-c][17.6-c]dipyrazole.

17. 4 - androsteno[3.2-c][17.16-c]bis(pyrazole - N-carboxamide).

18. A 2,16 - bis(1 - hydroxy-lower-alkylidene) - 3,17-dioxosteroid selected from the group consisting of the androstane and etiocholane series.

19. A compound having the formula wherein R represents a member of the group consisting of hydrogen and lower-alkyl; X represents a member of the group consisting of $H_2$, (H)(OH) and O; and Y and Y' represent members of the group consisting of hydrogen and methyl.

20. A compound according to claim 19 in which a double bond is present in the 4,5-position of the steroid nucleus.

21. 2,16-bis(hydroxymethylene) - 4 - androstene-3,17-dione.

22. The process for preparing a steroido[17.16-c]pyrazole in which the steroid moiety has from seventeen to about twenty-three carbon atoms exclusive of ester radicals, and is selected from the group consisting of the estrane, androstane and etiocholane series, which comprises reacting a 16-(1-hydroxy-lower-alkylidene)-17-oxo-steroid selected from the group consisting of the estrane, androstane and etiocholane series with a member of the group consisting of hydrazine and hydrazine monosubstituted by a radical inert under the conditions of the reaction.

23. The process for preparing a compound having the formula

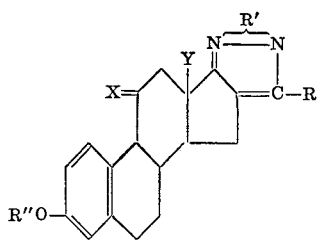

wherein R represents a member of the group consisting of hydrogen and lower-alkyl; R' represents a member of the group consisting of hydrogen, lower-alkyl, monocarbocyclic aryl, lower-alkanoyl, monocarbocyclic aryloxy-lower-alkanoyl, carbamyl and guanyl; R'' represents a member of the group consisting of hydrogen, lower-alkyl and carboxylic acyl derived from carboxylic acids having from one to about ten carbon atoms and having a molecular weight less than about 200; X represents a member of the group consisting of $H_2$ (H) (OH) and O; and Y represents a member of the group consisting of hydrogen and methyl, which comprises reacting a compound having the formula

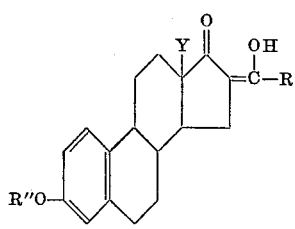

wherein R, R'' and Y are identical with their selection above, with a hydrazine having the formula R'NHNH$_2$, wherein R' is identical with its selection above.

24. The process for preparing 3-hydroxyl-1,3,5(10)-estratrieno[17.16-c]pyrazole, which comprises reacting 3-hydroxy-16 - hydroxymethylene - 1,3,5(10) - estratrien-17-one with hydrazine.

25. The process for preparing a compound having the formula

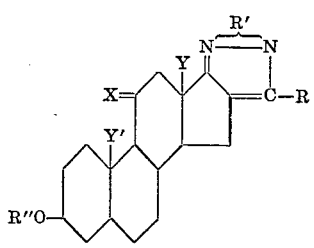

wherein R represents a member of the group consisting of hydrogen and lower-alkyl; R' represents a member of the group consisting of hydrogen, lower-alkyl, monocarbocyclic aryl, lower-alkanoyl, monocarbocyclic aryloxy-lower-alkanoyl, carbamyl and guanyl; R'' represents a member of the group consisting of hydrogen and carboxylic acyl derived from carboxylic acids having from one to about ten carbon atoms and having a molecular weight less than about 200; X represents a member of the group consisting of $H_2$, (H) (OH) and O; and Y and Y' represent members of the group consisting of hydrogen and methyl, which comprises reacting a compound having the formula

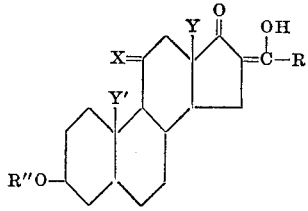

wherein R, R'', X, Y and Y' are identical with their selection above, with a hydrazine having the formula R'NHNH$_2$, wherein R' is identical with its selection above.

26. The process according to claim 25 in which a double bond is present in the 5,6-position of the steroid nucleus.

27. The process for preparing a steroido[3.2-c][17.16-c]dipyrazole in which the steroid moiety has from seventeen to about twenty-one carbon atoms exclusive of ester radicals, and is selected from the group consisting of the androstane and etiocholane series, which comprises reacting a 2,16-bis(1-hydroxy-lower-alkylidene) steroid selected from the group consisting of the androstane and etiocholane series with a member of the group consisting of hydrazine and hydrazine substituted by a radical inert under the conditions of the reaction.

28. The process for preparing a compound having the formula

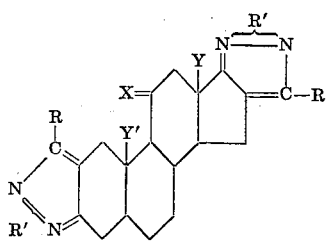

wherein R represents a member of the group consisting of hydrogen and lower-alkyl; R' represents a member of the group consisting of hydrogen, lower-alkyl, monocarbocyclic aryl, lower-alkanoyl, monocarbocyclic aryloxy-lower-alkanoyl, carbamyl and guanyl; X represents a member of the group consisting of $H_2$, (H)(OH) and O; and Y and Y' represent members of the group consisting of hydrogen and methyl, which comprises reacting a compound having the formula

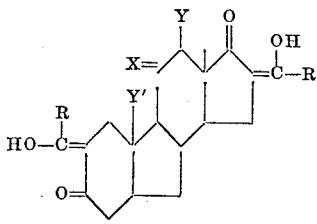

wherein R, X, Y and Y' are identical with their selection above, with a hydrazine having the formula R'NHNH$_2$, wherein R' is identical with its selection above.

29. The process according to claim 28 in which a double bond is present in the 4,5-position of the steroid nucleus.

30. The process for preparing a 2,16-bis(1-hydroxyalkylidene)-3,17-dioxo-steroid selected from the androstane and etiocholane series, which comprises reacting a 3,17-dioxo-steroid selected from the groups consisting of the androstane and etiocholane series with a lower-alkyl lower-alkanoate, RCOOR''', wherein R is selected from the group consisting of hydrogen and lower-alkyl radicals, and R''' is a lower-alkyl radical, in the presence of a strong base under anhydrous conditions.

31. The process for preparing a compound having the formula

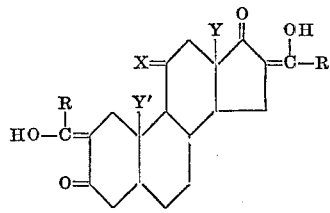

wherein R represents a member of the group consisting of hydrogen and lower-alkyl; X represents a member of the group consisting of $H_2$, (H)(OH) and O; and Y and Y' represents members of the group consisting of hydrogen and methyl, which comprises reacting a compound having the formula

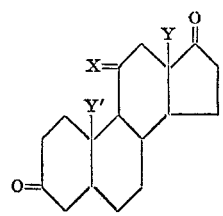

with a lower-alkyl lower-alkanoate, RCOOR''', wherein R is selected from the group consisting of hydrogen and lower-alkyl radicals, and R''' is a lower-alkyl radical, in the presence of a strong base under anhydrous conditions.

32. The process according to claim 31 in which a double bond is present in the 4,5-position of the steroid nucleus.

33. 16-hydroxymethyleneetiocholan-3α-ol-11,17-dione.

34. A compound having the formula

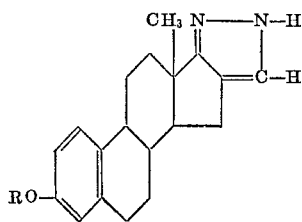

wherein R is a member of the group consisting of hydrogen, lower alkyl and an acyl radical of a hydrocarbon carboxylic acid containing up to eight carbon atoms.

35. A member of the group consisting of a compound of the formula

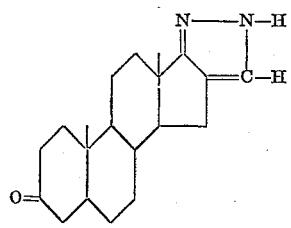

and the corresponding $\Delta^4$ derivative thereof.

36. A member of the group consisting of a compound of the formula

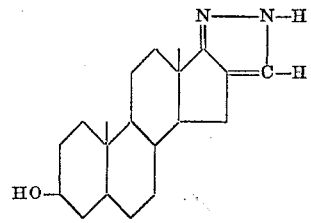

and the corresponding $\Delta^5$ derivative thereof.

37. 5α-androstane [3,2-c]-[17,16-c]-dipyrazole.

38. A compound selected from the group consisting of (A) compounds of the formula

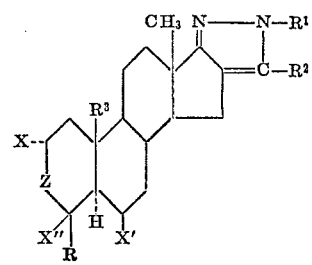

wherein R, $R^3$, X and X' are members of the group consisting of hydrogen and methyl; $R^1$ is a member of the group consisting of hydrogen, lower-alkyl, mono-carbocyclic aryl and carbamyl; $R^2$ is a member of the group consisting of hydrogen and lower-alkyl; Z is a member of the group consisting of C=O and CH(OH); X" is a member of the group consisting of hydrogen, methyl and halogen;

(B) compounds of the above formula having a double bond in the 4,5-position, RH being eliminated and Z being C=O; and (C) compounds of the above formula having a double bond in the 5,6-position, X'H being eliminated and Z being CH(OH); and (D) compounds of the above formula having a double bond in the 4,5-position and a double bond in the 6,7-position, RH being eliminated and Z being C=O.

References Cited
UNITED STATES PATENTS

| | | | |
|---|---|---|---|
| 2,720,524 | 10/1955 | Mueller | 260—239.5 |
| 2,908,693 | 10/1959 | Ringold et al. | 260—397.4 |
| 2,937,168 | 5/1960 | Dodson | 260—239.5 |

H. A. FRENCH, *Primary Examiner.*

UNITED STATES PATENT OFFICE
CERTIFICATE OF CORRECTION

Patent No. 3,398,140                          August 20, 1968

Raymond O. Clinton

It is certified that error appears in the above identified patent and that said Letters Patent are hereby corrected as shown below:

In the heading to the printed specification, line 2, "PYROZOLES" should read -- PYRAZOLES --. Column 1, lines 22 to 32, the upper right-hand portion of the formula should appear as shown below:

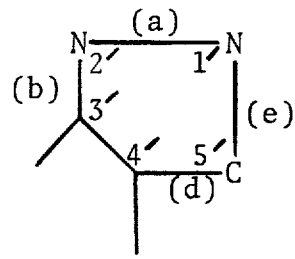

Column 2, line 63, "carbmyl" should read -- carbamyl --. Column 3, lines 17 to 22, the right-hand portion of the formula should appear as shown below:

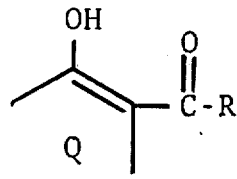

same column 3, lines 65 to 75, the lower left-hand portion of the formula should appear as shown below:

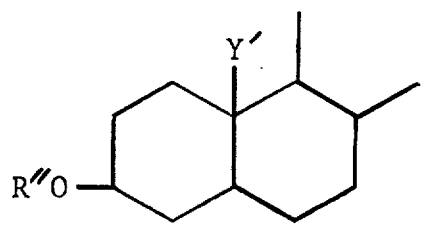

3,398,140

(2)

Column 4, lines 3 to 13, the upper right-hand portion of the formula should appear as shown below:

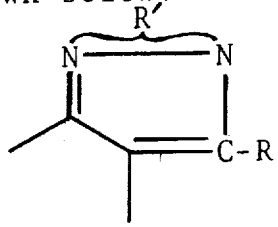

same column 4, lines 65 to 75, and column 5, lines 13 to 23, the upper right-hand portions of formulas IX and X should appear as shown below:

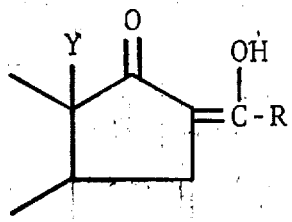

Column 8, line 28, "means" should read -- mean --. Column 9, line 4, "equilenin" should read -- equilin --. Column 10, line 64, "COCH$_2$C$_6$H$_6$," should read -- COCH$_2$C$_6$H$_5$, --. Column 12, line 50, "2-ethoxyallyl" should read -- 2-ethoxyoxalyl --. Column 13, line 15, "[17.16]" should read -- [17.16-c] --; line 43, "3β-(3,5-" should read -- 3β-(3,4,5- --; lines 51 and 52, 59, 67, and 69, "androstano", each occurrence, should read -- androsteno --. Column 15, line 30, "[17.16-]" should read -- [17.16-c] --; line 62, "pyraxole" should read -- pyrazole --. Column 16, line 40, "-3βIOA-ol-" should read -- -3β-ol- --. Column 18, line 2, "[4.2-c]" should read -- [3.2-c] --. Column 20, lines 31 to 40, the formula should appear as shown below:

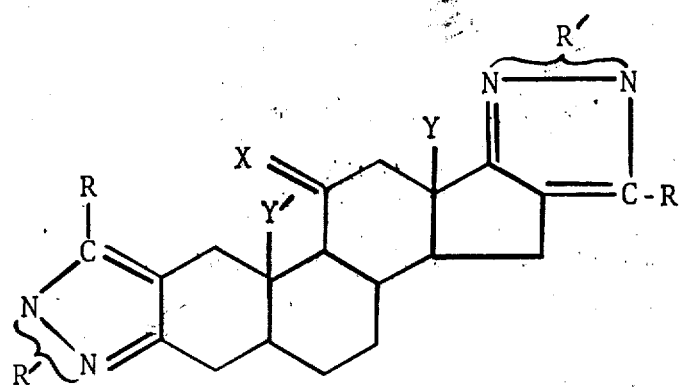

same column 20, line 53, "[17.6-c]" should read -- [17.16-c] --.
Column 21, line 37, "H$_2$" should read -- H$_2$, --. Column 22, lines
55 to 64, the formula should appear as shown below:

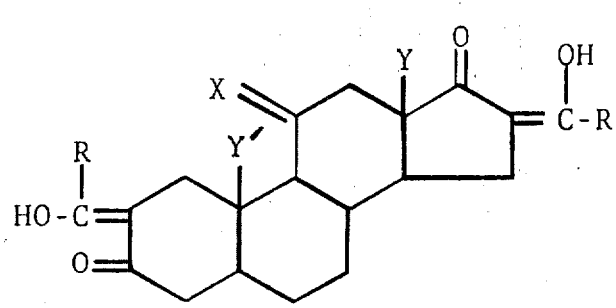

Signed and sealed this 3rd day of March 1970.

(SEAL)
Attest:

EDWARD M. FLETCHER, JR.        WILLIAM E. SCHUYLER, JR.
Attesting Officer              Commissioner of Patents